March 31, 1953  B. JORGENSEN  2,633,099
CEMENT APPLYING MECHANISM FOR SHOE MACHINES
Filed Nov. 2, 1950  5 Sheets-Sheet 1

Inventor
Bernhardt Jorgensen
By his Attorney
Thomas Ryan

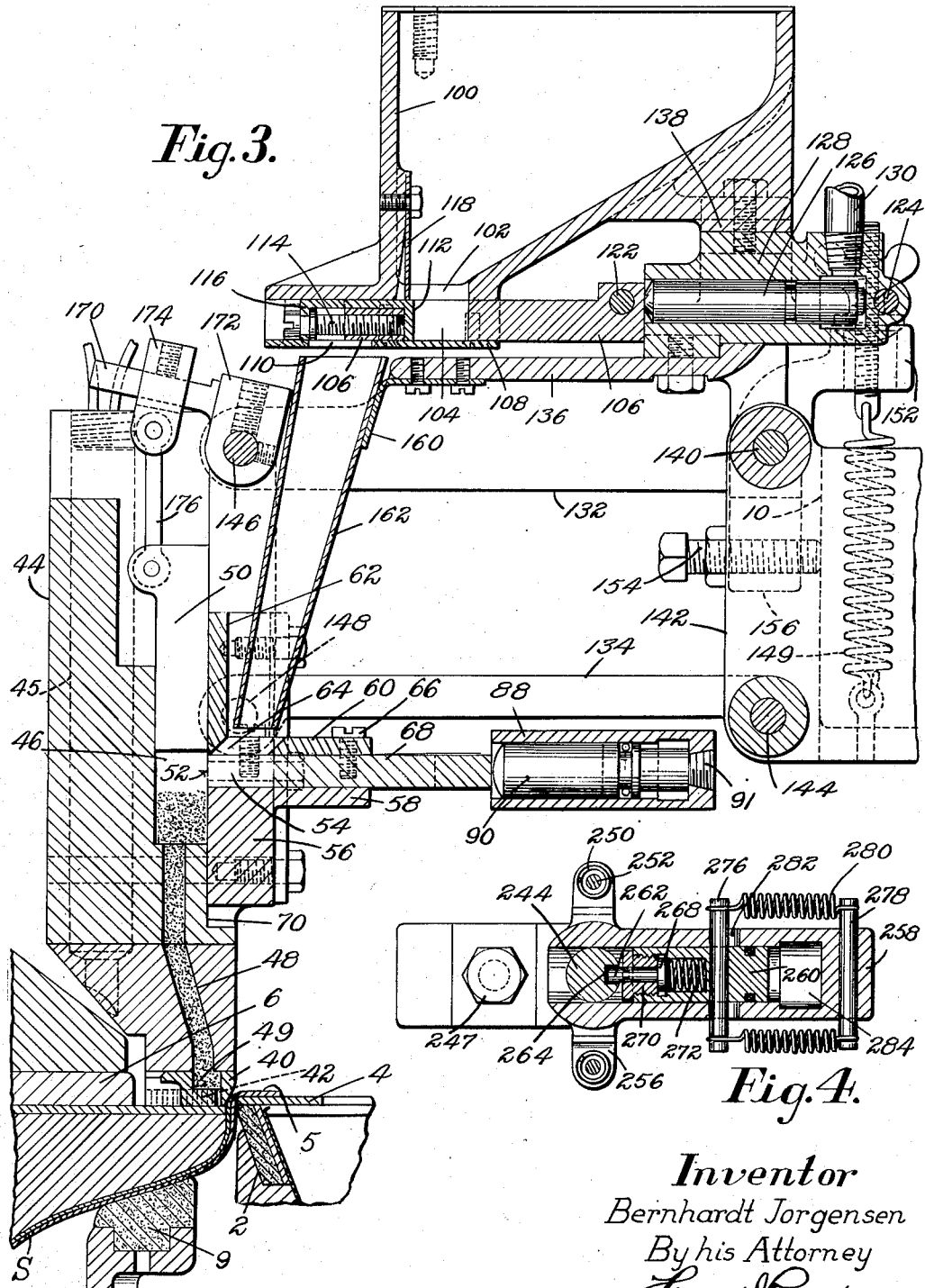

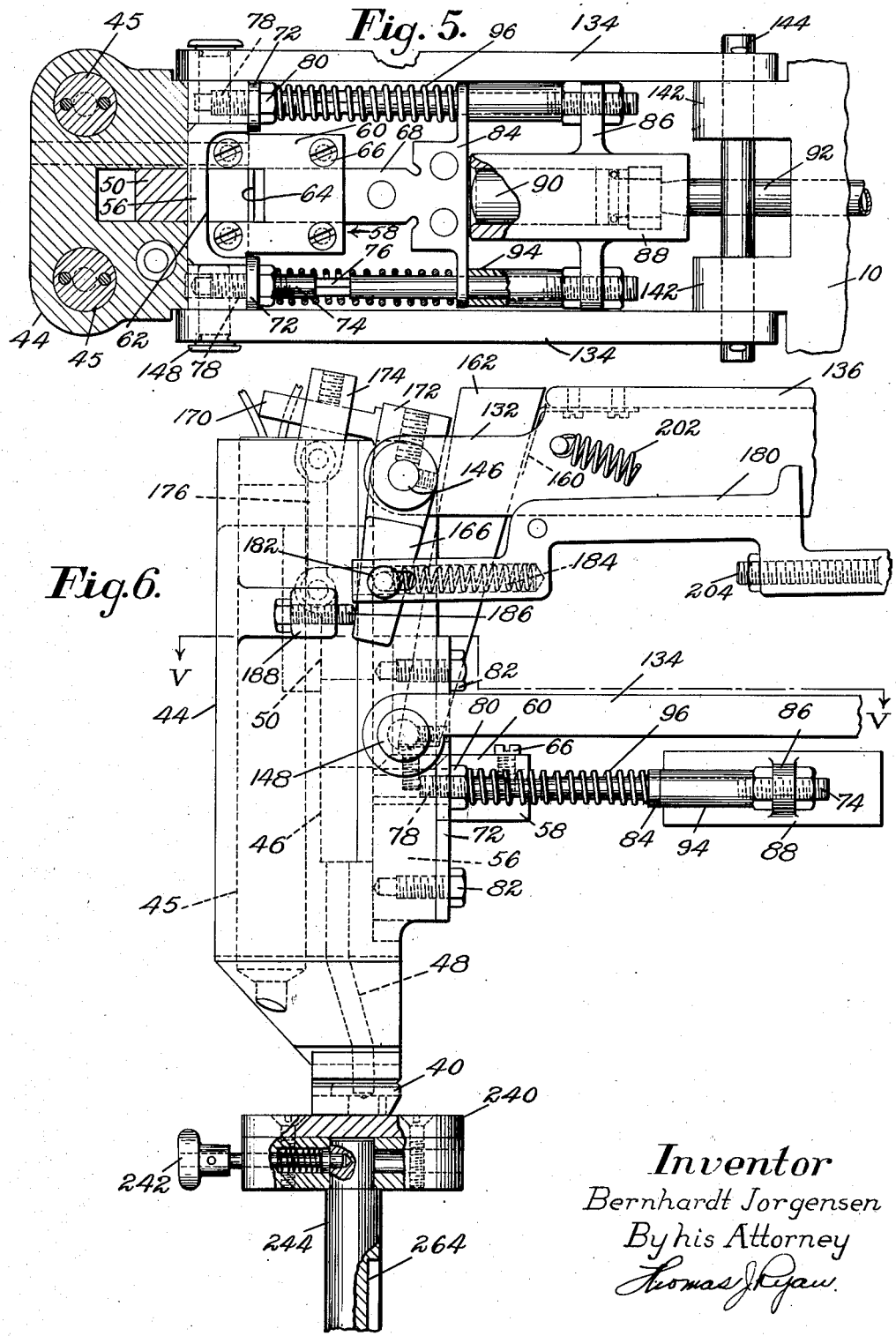

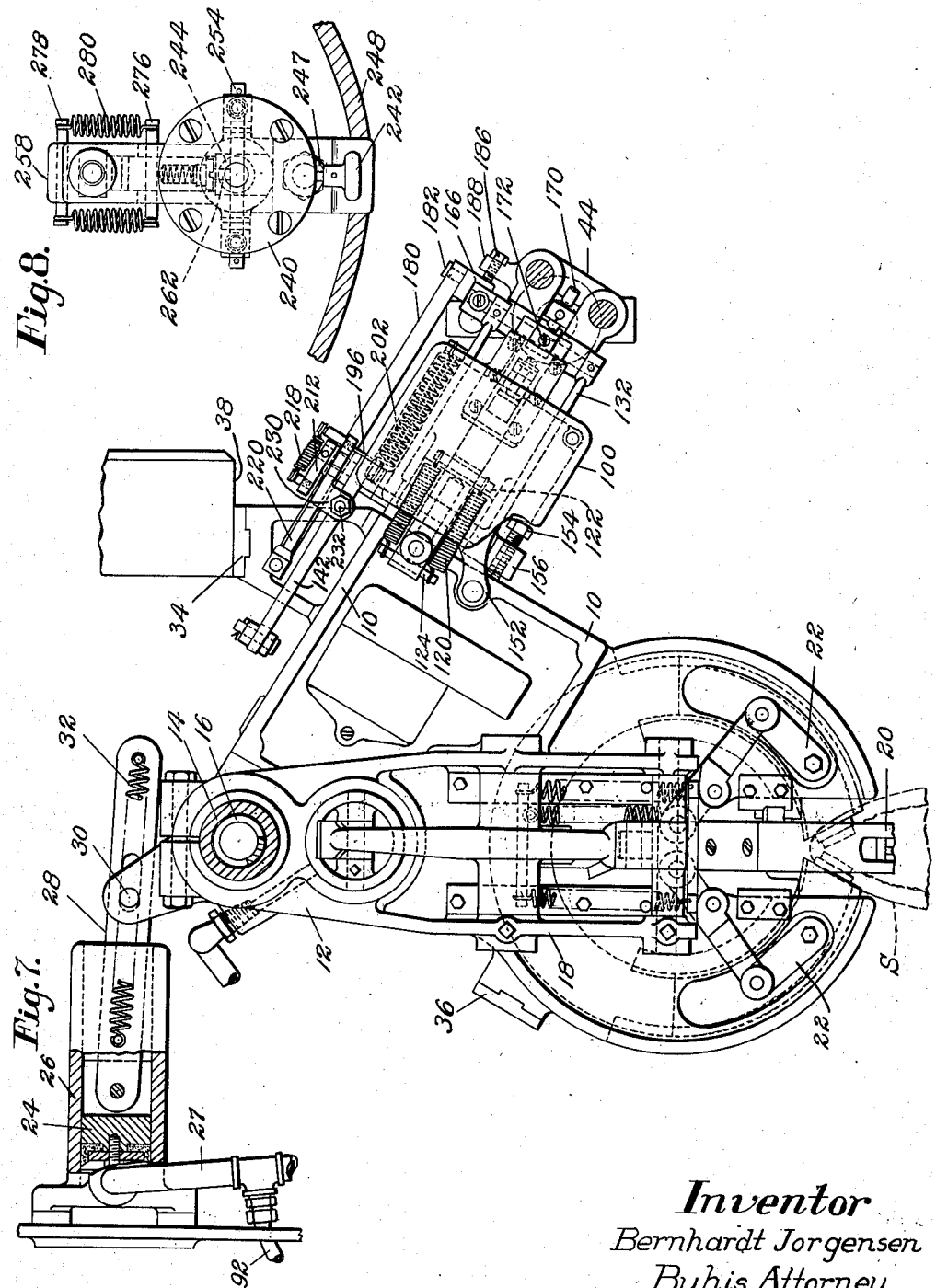

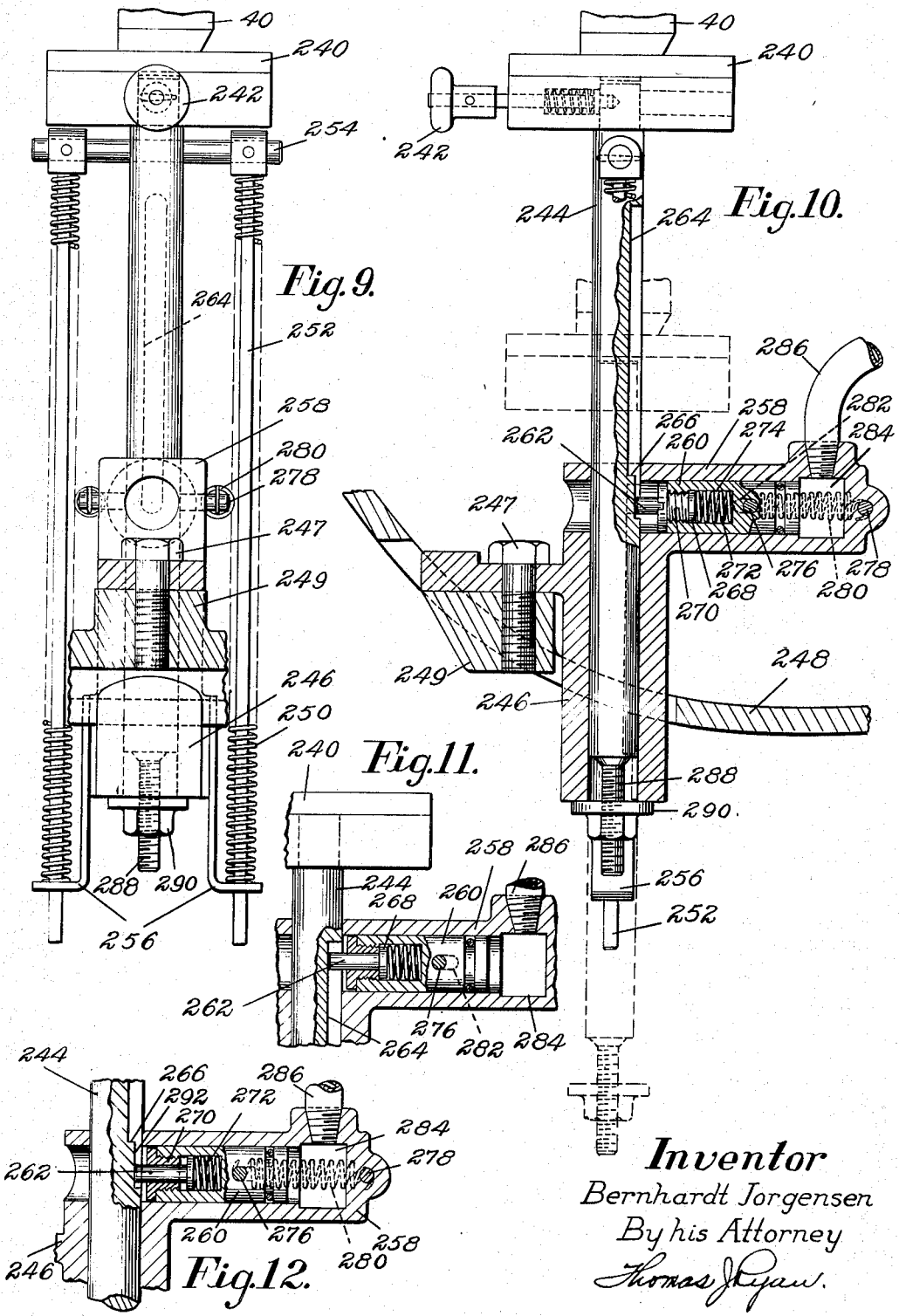

Patented Mar. 31, 1953

2,633,099

UNITED STATES PATENT OFFICE 2,633,099

CEMENT APPLYING MECHANISM FOR SHOE MACHINES

Bernhardt Jorgensen, Marblehead, Mass., assignor to United Shoe Machinery Corporation, Flemington, N. J., a corporation of New Jersey Application November 2, 1950, Serial No. 193,649

4 Claims. (Cl. 118—415)

1

This invention relates to a cement-applying mechanism for use in machines for operating upon shoes. It is illustrated as embodied in a machine of the type shown in Letters Patent of the United States No. 2,324,509, granted July 20, 1943, upon my application.

One method of lasting the toe end of a shoe includes the application of a small quantity of quick-setting cement to the toe end of an insole just before the upper is finally wiped over the insole and the cement is depended upon to hold the overlasted upper in place. When this operation is carried out in an automatic machine, it is particularly important that the cement that is applied shall be quick setting so that it will not be necessary to hold the upper in place for any extended time. Ordinarily such cements are thermoplastics and are difficult to handle because of the necessity of using heat to soften the cement and the further fact that the continued application of heat tends to deteriorate the cement. Furthermore, the use of the machine at the beginning of the day is delayed until the quantity of cement in a receptacle therefor may be melted and not infrequently until the receptacle has been cleaned out and refilled.

The machine illustrated provides a cement-applying mechanism which is free of these difficulties and in which the operations of feeding, injecting and extruding mechanisms to be described are carried out in timed relation to the operations of other parts of the machine including that of a carrier which, as in the patented machine, transfers the cement-applying mechanism from an idle position to a position over the work and then brings it down into contact with the work.

Preferably, and as illustrated, the necessity of heating all of a large quantity of cement is avoided by supplying the material in discrete particles or grains, transferring a small quantity approximately sufficient for a single operation from a supply hopper to a heating chamber where the material is liquefied, injecting this liquified material into a pump chamber, and causing actuation of the pump in timed relation with the operation of other parts of the machine, as a nozzle connected to the extruding device comes into cooperative relation with the work.

When the cement-applying mechanism is in idle position it may happen that the small remaining quantity of cement which is in the extruding mechanism drips from the nozzle openings, thus soiling the machine. To avoid this difficulty there is provided, in accordance with

2 an important feature of the invention, a closure which is supported on the machine beneath the nozzle when the latter is in idle position laterally of the shoe. Preferably, this closure is mounted upon a vertical slide arranged to be elevated by a spring but held in a predetermined lowered position, by means of a detent opposing the spring, as the nozzle swings into position above it. The actuation of this detent to release the closure is effected by fluid-pressure-operated means which acts in time relation to the swinging of the nozzle carrier and the operation of the extruding mechanism.

These and other features of the invention will best be understood from a consideration of the following specification taken in connection with the accompanying drawings in which:

Fig. 3 is a vertical section on a larger scale through substantially the center of the cementing apparatus to show the various cement-transmitting passages;

Fig. 4 is a horizontal detail section through the hydraulic detent for a post supporting a nozzle closure, taken on the line IV—IV of Fig. 1;

Fig. 5 is a plan view in detail of a loading plunger by which the cement is pushed into the pump cylinder;

Fig. 6 is a side elevation of the pump mechanism together with the pump-loading plunger;

Fig. 7 is a plan view of the swinging carrier on which a trimming mechanism and the cementing mechanism are mounted;

Fig. 8 is a plan view of the nozzle-sealing closure of Fig. 1;

Fig. 9 is a side elevation, with parts in section, of parts associated with a spring-elevated post on which the closure is mounted;

Fig. 10 is a vertical section through the post and the hydraulically controlled detent for the post; and Figs. 11 and 12 are detail views showing the hydraulically controlled detent for the closure post in different operative positions.

Figures 1, 2:
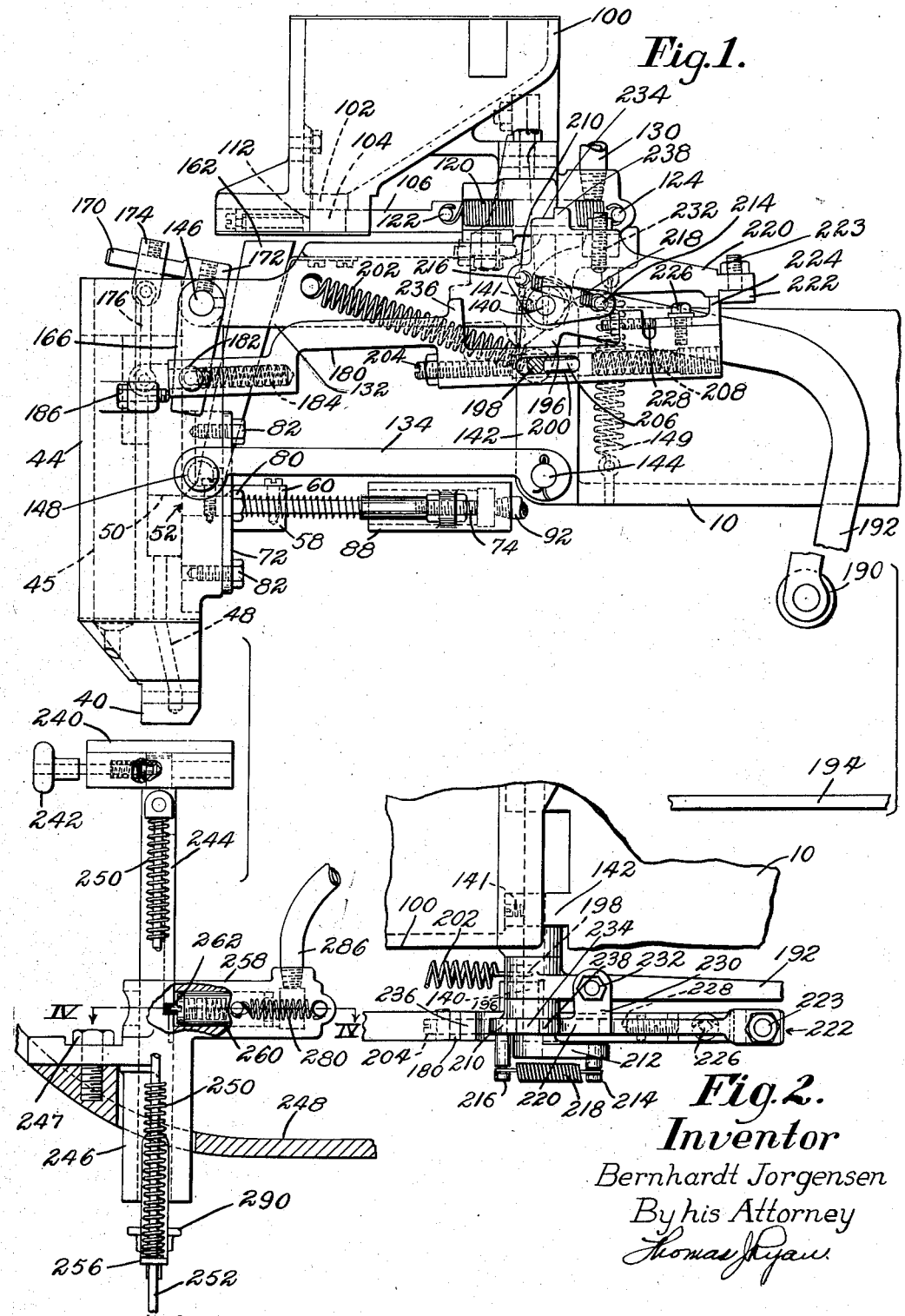
Fig. 1 is a side elevation of the cement-applying mechanism and the associated nozzle-sealing closure.
Fig. 2 is a fragmentary plan view of a trip mechanism controlling the operation of the pump plunger.

The invention is illustrated as embodied in the lasting machine shown in the above-mentioned United States Letters Patent No. 2,324,509. This has various lasting instrumentalities which cooperate to last the toe end of a shoe positioned bottom upward, including a toe former 2 (Fig.

3) which embraces the toe end of the shoe and wipes the upper heightwise of the last, and wipers 4 which thereafter wipe the margin of the upper inwardly over an insole on the last. The machine includes also an upper-trimming device which trims off the margin of all but the outer layer of the toe-end portion of the upper materials, leaving the margin 5 of the outer layer outspread over the wipers as illustrated in Fig. 3.

The shoe is positioned in proper relation to the lasting instrumentalities and to the cement-applying means hereinafter described by a member 6 which engages the bottom of the toe end of the insole. The operator mounts the shoe with the insole in engagement with the member 6 prior to the starting of the cycle of power operations of the machine. After the starting of the machine a toe rest 9 and a heel rest (not shown) are moved into positions such that the toe rest will clamp the shoe against the member 6 and they will support it thereafter against downward and lengthwise movements during the operation of the machine.

The cement handling apparatus is mounted upon an arm 10 forming part of a carrier 12 (Fig. 7) clamped to a hollow post 14 which is supported on the frame of the machine for up and down and swinging movements. Downward movement of this carrier is cushioned by a spring 16 within the hollow post 14 and the spring serves to elevate the carrier when there is no fluid pressure against the top of the post. This carrier also has an arm 18 upon which there is supported trimming apparatus comprising a knife (not shown) supported upon a depending arm 20 and side knives supported upon slidable arcuate members connected to the links 22. In Fig. 7 the trimming apparatus is shown over the position in which a shoe S is supported bottom up as described above, but the cement handling apparatus may be brought into operative position above the work by swinging the carrier 12 around a vertical axis through the center of the post 14. To this purpose a hydraulically operated piston 24 within a cylinder 26 is connected by a link 28 to a pin 30 in an arm of the carrier. Pressure is applied to the cylinder 26 at the proper time through a conduit 27. When pressure is applied to the piston the carrier is swung to the cementing position as this and other operations are carried out in predetermined time relation. Its return movement, after pressure on the piston is relieved, is effected by a spring 32 connected at one end to the link 28 and at its other end to the cylinder 26. The limits of movement of the swinging carrier are determined by bumpers 34 and 36 adapted to come in contact with suitable abutments of the machine such as the abutment 38 shown in contact with the bumper 34.

The machine is arranged to effect the application of a quantity of cement on the toe end of the insole of the shoe S (Fig. 3) after the margin 5 of the outer layer of the upper materials is pulled out over the wipers. To this end, an extruding mechanism or device is provided including a heated pump joined to a nozzle 40 having a series of small passages 42 arranged in a horseshoe-like pattern. The nozzle is supported at the bottom end of a casting 44 heated by electric units 45 and containing a pump cylinder 46, the lower end of which is connected by a passage 48 to suitable laterally diverging passages 49 which join together the outlet openings 42. Within the cylinder 46 is a plunger 50 shown in Figs. 1 and 3 in its raised position to uncover an opening 52 connecting with a heated chamber 54, to which granular cement is supplied, said chamber extending transversely of a block 56 (Fig. 3) and forming a part of the extruding device. The block has a laterally extending trough-like neck 58 closed by a cover plate 60 which extends in as far as the bottom of a channel 62 (Fig. 5) extending heightwise of the block 56. The plate 60 is notched to provide an opening 64 and is attached to ledges at the lower end of the channel 62 and to the upper edges of the trough-like neck 58 by screws 66, thus providing a guideway for an injecting plunger 68 for pushing the cement from the heating chamber into the cylinder 46. The block 56 is clamped in a recess 70 formed in the side of the casting 44 by means of heightwise extending side plates 72 which rest against edges of the block 56. Extending through said side plates and threaded at 76 in the casting 44 are elongated bolts 74 having squared wrench receiving portions 76. The plates are held in position by nuts 80 threaded on these bolts and also by cap screws 82 (Fig. 6) above and below these bolts.

The bolts 74 provide supports for a slide 84 (Fig. 5) integral with the head of the plunger 68 and also pass through ears 86 extending laterally from a cylinder 88 containing a piston 90 which may be moved to the left to operate the plunger 68 when hydraulic pressure is applied to an inlet 91 (Fig. 3) through a flexible tube 92 joined to the conduit 27 (Fig. 7) for the carrier-swinging cylinder 26, for example, thus operating the injecting plunger in time relation to and during the swinging movement of the carrier and hence in time relation to its heightwise movement. Spacers or sleeves 94 (Fig. 5) surround the bolts 74 to limit the return movement of the plunger slide 84, which is pushed to the right by means of springs 96 surrounding the bolts 74 between the nuts 80 and the slide 84.

Thermoplastic cementitious material in granular form and thus in discrete particles is contained in a hopper 100 (Fig. 3) having a bottom opening 102 communicating with a recess 104 in a slide 106 which is held in a groove at the bottom of the hopper by means of a retaining plate 108 having an opening 110. One side of the measuring recess 104 in the slide 106 is formed by a movable piece 112, shaped like an inverted U, and adapted to be adjusted in position on the slide by means of a screw 114 rotatably mounted at 116 in the end of the piece and threaded in the slide. A scraper 118 attached to the side face of the hopper rests at its bottom edge upon the top of the slide 106 and serves to level the charge retained in the recess 104. The slide 106 is normally retracted to the position shown in Fig. 3 by means of a pair of springs 120 (Fig. 1) attached to cross pins 122 and 124 and is moved to the left to deliver a charge of material through the opening 110 by means of a plunger 126 operable in a cylinder block 128 when fluid pressure is delivered through a conduit 130, connected, for example, to a cylinder of the patented machine which operates the heel rest therein. The measuring means and the injecting means are arranged for operation in predetermined time relation to one another and to the movements of the carrier 12.

The cement handling apparatus is carried, as in the patented structure, upon pairs of parallel links 132 and 134 (Fig. 1) which are hinged on the arm 10. The upper pair 132 is bridged by a cover 136 (Fig. 3) and the cylinder block 128 is attached by screws to the upper face of this cover 136 and to a lug 138 upon the under side of the hopper 100. The upper pair of links 132 is pivoted on a cross rod 140 extending between ribs 142 (Figs. 1 and 2) integral with an end face of the carrier arm 10. The rod 140 is held against turning by a setscrew 141 (Fig. 3). The bottom links 134 are mounted upon a similarly supported cross rod 144. On the forward ends of these pairs of parallel links, the casting 44 is supported by a rod 146 extending through the upper links and by a pair of headed studs 148 extending through the ends of the lower links. This carrier apparatus for the cement-handling mechanism is nearly counterbalanced by a spring 149 interpositioned between the carrier arm 10 and the under side of an arm 152 (Figs. 3 and 7) extending inwardly from the upper links 132. Downward movement of the casting 44 supported on the links is limited by a screw 154 threaded in a lug 156 depending from one of the upper links 132, said screw being adapted to bear against the end of the arm 10.

The cover 136 of the upper links 132 also serves to carry a plate 160 supporting a chute 162 adapted to receive granular material dropped through the opening 110 and to lead it to the opening 64 above the chamber 54. By this arrangement the transfer of heat from the casting 44 to the hopper is largely prevented. The heating units 45 mounted in the casting 44 supply heat to the block 56 sufficient to keep any cement in the pump 46 in fluid condition and also to melt any granular material deposited in the recess 54.

Extrusion of the cement through the nozzle onto the toe of the insole is effected by means of a pump-operating mechanism causing a short sudden downward movement of the pump plunger 50 far enough to pass the opening 52, closed at that time by the end of the injection plunger 68. This mechanism includes a bell crank lever comprising a depending arm 166 (Fig. 1) and a rod 170. The arm is attached to a cross rod 146 in the outer ends of the upper links 132 and the rod 170 is attached to a block 172 (Fig. 7) which is secured by a setscrew to a mid portion of the rod 146. Adjustably secured to this rod 170 is a block 174 (Fig. 6) between which and the upper end of the pump plunger 50 is a pitman link 176. The arm 166 of this bell crank is connected to an operating link 180 by means of a pin 182 traversing a slot in the operating link and resting against a spring 184 in a recess in the link. Upward movement of the pump plunger is limited by a stop screw 186 (Figs. 6 and 7) adjustably positioned in a lug 188 extending laterally from the side of the block 44.

A snap movement of the operating link 180 so as suddenly to depress the pump plunger 50 to extrude a small quantity of cement on the insole is controlled as in the patented machine by the contact of a roll 190 (Fig. 1) at the lower end of a curved trigger leg 192 with a surface 194 forming a fixed part of the machine as the carrier and its arm 10 move vertically to bring the nozzle 40 against the work. The upper end of the curved leg 192 is free to turn on the cross rod 140 (Figs. 1 and 2) upon which the upper links 132 are pivoted. Extending downwardly from the upper end of the leg 192 and integral with it is an arm 196 having a laterally extending pin 198 which passes through a slot 200 in the operating link 180 and which also extends to the other side of arm 196 to permit attachment of a restoring spring 202, the other end of which is secured to one of the upper parallel links 132. Ending inside the slot 200 of the operating link there is a screw 204 which adjustably determines the limit of movement of the pin 198 in that slot. At the other side of the pin 198 there is a round ended block 206 in the link urged against the pin by means of a spring 208 contained in a cavity in the operating link.

Pivoted on the rod 140 is a link-controlling latch 220 (Figs. 1 and 2) having at its outer end a plate 222 held by a bolt 223. The plate is adapted to overlap and engage an angle piece 224 adjustably secured to the end of the operating link 180 by means of a clamp screw 226, thus holding the link against the stored up force of its spring 208. The position of the angle piece 224 may be determined by a screw 228 before the clamp screw 226 is set up. The left end of this latch has a lug 210 carrying a stud 216. A latch-returning spring 218 joins this stud to a stud 214 on an arm 212 which is pinned to the near end of the cross rod 140.

The latch 220 is also provided with a rearwardly extending lug 230 (Fig. 2) in which there is a trigger screw 232 adapted to be contacted at its lower end by the upper side of the trigger leg 192 as the rod 140 is lowered by downward movement of the carrier arm 10 and the curved leg 192 is consequently swung counterclockwise by contact with the fixed surface 194 on the machine. When the curved leg 192 strikes this trigger screw 232 it lifts the latch 220 and allows the spring 208, which has been compressed by counterclockwise movement of the depending arm 196 and its pin 198, to expand and snap the operating link 180 to the right thereby giving a quick downward thrust to the pump plunger 50 to extrude cement onto the insole. As the carrier arm 10 is raised again, the restoring spring 202 causes the link 180 to lift the pump plunger. The latch 220, being held against the angle piece 224 by the latch spring 218 which interconnects a pin 216 on the latch and a pin 214 on the fixed arm 212, snaps over the top of that angle piece to hold the operative link against movement to the right and leaves the link spring 208 ready to be loaded again in the next cycle.

It is desired to operate the rest of the machine without extruding cement, then the latch plate 220 may be turned counterclockwise through 90° to bring a lug 234 at the top of this plate into contact with the right side of a hump 236 on the operating link 180. Immediately adjacent the lug 234 is a projection 238 which engages the top of this hump 236 to prevent the spring 218 from pulling the latch plate 220 more than 90° around to the left. At the same time the spring 218 having passed the center of the rod 140 will hold the latch plate 220 up in the air and the operating link against movement to the right so that the action of the leg 192 is simply to compress the spring 208 without operating the pump.

As the carrier rises and swings back into the trim position shown in Fig. 7 there is a tendency for the small remaining amount of cement in the pump cylinder and in the passage of the nozzle to ooze out and drip. The nozzle passages 42 are small and hence the tendency depends upon the fluidity of the cement in the heated block 44 and the size of the nozzle openings together with the degree of viscosity of the cement itself. However, a closure 240 (Figs. 9 and 10) for the nozzle, while it is in this idle position, has been provided. This closure has a spring operated pin 242 to enable it to be removably mounted upon the upper end of a sliding post 244 and the latter is movable vertically in a guide 246 which is attached by screw 247 to a cross bar 249 on the casing 248 of the machine. Springs 250 to rise the closure and post surround guide rods 252, which are attached to a cross pin 254 extending through the upper end of the post and which slide in brackets 256 which are attached to the guideway.

A cylinder 258 (Figs. 10, 11 and 12) extending laterally from the guide 246 contains a piston 260 in one end of which is yieldably supported a detent 262 adapted to be received in a groove 264 in one side of the post. The lower end of this groove is reduced in depth to provide a shoulder 266 for a purpose which will later appear. The detent 262 is slidable in a plug 270 which is threaded in the end of the piston 260 and has a head 268 lying inside the plug. This detent is urged outwardly by a spring 272 positioned between the end of a recess 274 (Fig. 10) in the piston and the head 268 of the detent.

This piston 260 carries a cross rod 276 which is joined by a pair of springs 280 to another rod 278 in the cylinder 258. The springs 280 pull the piston and its detent back to the position shown in Fig. 4 when no fluid pressure is applied to the piston. It will be noted that the rod 276 passes through slots 282 in the sides of the cylinder 258 thus limiting the movement of the piston. A chamber 284 in the cylinder 258 and adjacent to the head of the piston 260 may be connected by a conduit 286 to a fluid pressure line from which fluid is supplied to operate the heel rest (not shown). Accordingly, pressure is applied almost at the beginning of the cycle and is maintained to a point late in the cycle when the wipers (not shown) of the lasting machine are being withdrawn, this application of pressure being thus in time relation to other operations and movements such as that of the carrier 12. A screw 288 (Fig. 10) attached to the bottom of the post 244 has a flanged nut 290 acting to limit upward movement of the post by contact with the bottom of the guide 246.

In the operation of the machine, substantially at the start of the cycle carried out in predetermined time relation as in the patented machine, pressure is applied in the chamber 284 and the detent is pressed against the shallow portion 292 of the post groove, the carrier 12 at that time being in the position shown in Fig. 7. The measuring plunger 106 is moved to the left, depositing granular cement in the chute 162 leading to the heating chamber 54. The carrier moves down, the upper is wiped up over the last, and the lining and toe box are trimmed. The nozzle 40 moves down with the carrier and depresses the nozzle-sealing closure 240 against the springs 250 as indicated in dotted lines in Fig. 10 to the lowest position shown in Fig. 11 and in dotted lines in Fig. 10.

At that time, even though there is pressure against the piston 260, the detent does not seat in the deeper portion of the groove 264 because of contact of the cross rod 276 with the slots 282 (Fig. 4) and serves merely to prevent the sliding post from turning in the guideway. When the carrier is lifted by the spring 16 because of the relief of pressure against the end of cylinder 14, at the end of the trimming operation, the closure follows the nozzle up until the detent strikes the shoulder 266 holding the closure from further upward movement while the nozzle continues a slight additional distance until these two parts are in the positions shown in Fig. 1.

Soon after that the carrier is swung clockwise, as viewed from above, by fluid pressure on the piston 24, to bring the nozzle to the cementing position above the shoe S while the closure remains in the position shown in Fig. 1. Fluid pressure is applied to the injecting plunger 68, the latter being held in innermost position to seal the opening 52 in the pump cylinder and the nozzle moves down with the carrier to apply cement to the insole of the shoe and then rises to give room for the wipers which overlast the upper.

The carrier is returned in a counterclockwise direction by the action of the spring 32 (Fig. 7) to bring it back to the trim position shown in Fig. 7 and the pressure on the injection plunger 68 is relieved permitting the latter to be drawn back by springs 96. Then the measuring plunger 106 is released to its springs 120 and pressure is released in the chamber 284 allowing the detent to be pulled back to the position shown in Fig. 10 by the spring 280 thus allowing the closure to rise into contact with the nozzle to seal it and prevent any dripping until the cycle is started again.

Having thus described my invention, what I claim as new and desire to secure by Letters Patent of the United States is:

1. In a machine for operating upon shoes, a support for a shoe positioned bottom upward, a device for applying cement to the shoe bottom, a movable carrier for said device mounted for vertical movement to carry it toward and away from the shoe and for swinging movement to carry said device into and out of operating position over the shoe, said cement-applying device including a depending nozzle, a closure movably supported on the machine beneath the nozzle when the latter is in idle position away from the shoe, means controlling the heightwise position of said closure, an extruding device connected to the nozzle, means for delivering a charge of cement to said extruding device, and fluid-pressure-operated means for controlling said closure and fluid-pressure-operated means for operating said delivering means.

2. In a machine for operating upon shoes, a support for a shoe positioned bottom upward, a device for applying cement to the shoe bottom, a movable carrier for said device mounted for vertical movement to carry it toward and away from the shoe and for swinging movement to carry said device into and out of operating position over the shoe, said cement-applying device including a depending nozzle, a closure supported on the machine beneath the nozzle when the latter is in idle position away from the shoe, a spring tending to raise said closure, and a detent for retaining said closure against the action of said spring beneath the path of swinging movement of the nozzle during its movement.

3. In a machine for operating upon shoes, a support for a shoe positioned bottom upward, a device for applying cement to the shoe bottom, a movable carrier for said device mounted for vertical movement to carry it toward and away from the shoe and for swinging movement to carry said device into and out of operating position over the shoe, said cement-applying device including a depending nozzle, a closure subtending said nozzle when the latter is in idle position laterally displaced from the shoe, a vertical slide on which the closure is supported, a spring for raising the slide, a shoulder on the slide, and a detent for engagement with said shoulder to hold the closure at a level beneath the path of lateral movement of the nozzle during the swinging movement of the carrier.

4. In a machine for operating upon shoes, a support for a shoe positioned bottom upward, a device for applying cement to the shoe bottom, a movable carrier for said device mounted for vertical movement to carry it toward and away from the shoe and for swinging movement to carry said device into and out of operating position over the shoe, said cement applying device including a depending nozzle, a closure subtending said nozzle when the latter is in idle position laterally displaced from the shoe, a vertical slide on which the closure is supported, a spring for raising the slide, a shoulder on the slide, a detent for engagement with said shoulder to hold the closure at a level beneath the path of lateral movement of the nozzle during the swinging movement of the carrier, a spring for withdrawing the detent when the nozzle is above the closure, and fluid-pressure-operated means for moving the detent against such spring in time relation to a movement of the carrier to cause the detent to extend over the shoulder.

BERNHARDT JORGENSEN.

REFERENCES CITED

The following references are of record in the file of this patent:

UNITED STATES PATENTS

| Number | Name | Date |
|---|---|---|
| 992,885 | Lautenslauger | May 23, 1911 |
| 2,324,509 | Jorgensen | July 20, 1943 |